(12) United States Patent
He et al.

(10) Patent No.: US 10,720,773 B2
(45) Date of Patent: Jul. 21, 2020

(54) ELECTRIC CIRCUIT AND ASSOCIATED METHOD FOR REGULATING POWER TRANSFER IN A POWER GRID

(71) Applicant: City University of Hong Kong, Kowloon (HK)

(72) Inventors: Yuanbin He, Zhejiang (CN); Shu-Hung Henry Chung, Mid-Levels (HK); Chun-Tak Lai, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 15/859,888

(22) Filed: Jan. 2, 2018

(65) Prior Publication Data

US 2019/0214822 A1    Jul. 11, 2019

(51) Int. Cl.
*H02J 3/24* (2006.01)
*H02M 1/08* (2006.01)
*H02J 3/01* (2006.01)
*H02M 7/793* (2006.01)
*H02M 1/00* (2006.01)
*H02J 3/38* (2006.01)
*H02M 7/537* (2006.01)

(52) U.S. Cl.
CPC ............ *H02J 3/24* (2013.01); *H02J 3/01* (2013.01); *H02M 1/08* (2013.01); *H02M 7/793* (2013.01); *H02J 3/383* (2013.01); *H02M 7/537* (2013.01); *H02M 2001/0009* (2013.01)

(58) Field of Classification Search
CPC .... H02J 3/24; H02J 3/01; H02J 3/383; H02M 1/08
See application file for complete search history.

(56) References Cited

U.S. PATENT DOCUMENTS

| 2006/0044720 | A1* | 3/2006 | Couture | H02J 3/06 361/62 |
| 2010/0109447 | A1* | 5/2010 | Achilles | F03D 7/0284 307/153 |
| 2016/0065049 | A1* | 3/2016 | Wu | H02M 1/12 363/40 |
| 2018/0342871 | A1* | 11/2018 | Adamczyk | H02J 3/24 |

OTHER PUBLICATIONS

Z.Pan, F. Peng and S. Wang, "Power Factor Correction Using a Series Active Filter," IEEE Trans. Power Electron., vol. 20, pp. 148-153, Jan. 2005.

(Continued)

*Primary Examiner* — Daniel Kessie
(74) *Attorney, Agent, or Firm* — Renner Kenner Greive Bobak Taylor & Weber

(57) ABSTRACT

An electric circuit for regulating power transfer in a power grid includes a compensator circuit arranged to be connected between outputs of one or more power sources and a point of common coupling in the power grid. The compensator circuit is arranged to detect one or more electrical properties associated with the outputs and one or more electrical properties associated with the point of common coupling; and provide, based on the detection, a voltage output to emulate a resistor for suppressing filter resonance associated with the one or more power sources and to reduce equivalent impedance of the power grid.

18 Claims, 11 Drawing Sheets

(56) References Cited

OTHER PUBLICATIONS

H. Funato and A. Kawamura, "Proposal of variable active-passive reactance," in Int. Conf. Industrial Electonics, Control, Instrumentation, and Automation (IECON'92), San Diego, CA, Nov. 1992, pp. 381-388.

H. Funato, A. Kawamura, and K Kamiyama, "Realization of negative inductance using variable active-passive reactance (VAPAR)," IEEE Trans. Power Electron., vol. 12, No. 4, pp. 589-596, Jul.1997.

* cited by examiner

ELECTRIC CIRCUIT AND ASSOCIATED METHOD FOR REGULATING POWER TRANSFER IN A POWER GRID

TECHNICAL FIELD

The invention relates to an electric circuit and associated method for regulating power transfer in a power grid. More particularly, although not exclusively, the invention relates to electric circuit and associated method for reducing or cancelling grid impedance and damping filter resonance in a power grid.

BACKGROUND

In distributed power generation systems (DPGS), generally, one or more distributed power sources coupled with switching power converters (SPC) may provide direct or alternating current (DC or AC) to the distributed power generation network or circuit.

FIG. 1 shows an electrical network (power grid) of an exemplary AC distributed power generation system. The network 100 includes multiple individual PV strings 102A, 102B, . . . 102Z connected in parallel, each including a number of solar modules. A respective voltage source inverter 104A, 104B, 104Z is coupled with each of the PV strings 102A, 102B, . . . 102Z. The PV strings and associated voltage source inverters form multiple power sources connected with each other through cables 106, transformer 108, and cables 108 for connection to AC grid lines 112.

The distributed power generation system in FIG. 1 can be modeled by a Thevenin's equivalent circuit and a Norton's equivalent circuit (as shown in FIG. 2A). As shown in FIG. 2A, the Thevenin's equivalent circuit for the electrical network consists of an ideal voltage source $V_g$ and a series-connected equivalent grid impedance $Z_g$, and the Norton's equivalent circuit representing the SPC consists of the parallel-connected ideal current source $I_{s,i}$ and the corresponding output impedance $Z_{o,i}$.

An ideal voltage source can maintain a prescribed voltage across its terminals irrespective of the magnitude of the current flowing through it. However, in the circuit in FIG. 2A, due to the existence of the grid impedance $Z_g$ and the SPC output impedance $Z_{o,i}$, it is possible for the power sources to couple with each other, with their controllers interact or excite system resonances around transfer function complex conjugate poles. This may result in system instability.

FIG. 2B shows a simplified impedance modeling circuit of FIG. 2A. FIG. 3 are graphs showing magnitude and phase relationship between equivalent output impedance $Z_o$ of the switching power converters in the power sources and the equivalent grid impedance $Z_G$ in the power systems. Referring to FIGS. 2B and 3, system instability occurs when the following two conditions are satisfied:
- the value of equivalent grid impedance $Z_G$ intersects with that of the equivalent SPC output impedance $Z_o$; and
- the phase difference of $Z_G$ and $Z_O$ at the intersection frequency is around 180°.

SUMMARY OF THE INVENTION

In accordance with a first aspect of the invention, there is provided an electric circuit for regulating power transfer in a power grid (circuit), comprising: a compensator circuit arranged to be connected between outputs of one or more power sources and a point of common coupling in the power grid; wherein the compensator circuit is arranged to detect, directly or indirectly, one or more electrical properties associated with the outputs and one or more electrical properties associated with the point of common coupling; and provide, based on the detection, a voltage output to emulate a resistor for suppressing filter resonance associated with the one or more power sources and to reduce equivalent impedance of the power grid. Preferably, the voltage output is arranged to cancel the equivalent impedance of the power grid.

In a preferred embodiment of the first aspect, the compensator circuit is an active circuit.

Preferably, the one or more electrical properties associated with the outputs comprises current $i_o$ through the outputs of the power sources. Preferably, the one or more electrical properties associated with the point of common coupling comprises voltage $v_{PCC}$ at the point of common coupling.

In one embodiment of the first aspect, the compensator circuit is connected in series with the outputs.

In one embodiment of the first aspect, the compensator circuit comprises: a first voltage source arranged to provide a first voltage output to emulate a resistor for suppressing filter resonance associated with the one or more power sources; and a second voltage source arranged to provide a second voltage output to reduce equivalent impedance of the power grid; wherein the first and second voltage outputs form the voltage output. Alternatively, the compensator circuit may comprise a single voltage source arranged to emulate a resistor for suppressing filter resonance associated with the one or more power sources and to reduce equivalent impedance of the power grid.

In a preferred embodiment of the first aspect, the compensator circuit comprises: a voltage source; a power converter having a switching network, arranged to regulate voltage of the voltage source to provide the voltage output; and a controller for controlling the switching network. The controller may be formed by analog and/or digital components, including logic circuits, one or more processors, etc.

In a preferred embodiment of the first aspect, the voltage source comprises a capacitor.

The power converter is preferably a bi-directional power converter and/or a DC/AC power converter.

Preferably, the controller is arranged to: detect current $i_o$ through the outputs of the power sources and voltage $v_{PCC}$ at the point of common coupling.

Preferably, the controller is also arranged to: determine a first voltage based on the detected current $i_o$; determine a second voltage based on the detected voltage $v_{PCC}$; and filter the first and second voltages using a band-stop filter.

Preferably, the controller is also arranged to: detect voltage $v_{dc}$ of the voltage source; and compare the detected voltage $v_{dc}$ with a reference voltage $v_{dc,ref}$ to determine a difference signal.

Preferably, the controller is also arranged to: generate gating signals for controlling the switching network based on the filtered first and second voltages and the determined difference signal, so as to regulate the voltage output.

In one embodiment of the first aspect, the one or more power sources each comprises a switching power converter. The power sources may be renewable power sources.

The power grid is preferably an AC power grid but can also be a DC power grid.

In accordance with a first aspect of the invention, there is provided a method for regulating power transfer in a power grid, comprising: detecting, directly or indirectly, using a compensator circuit arranged between outputs of one or more power sources and a point of common coupling in the power grid, one or more electrical properties associated with the outputs and one or more electrical properties associated with the point of common coupling; providing, by the compensator circuit, based on the detection, a voltage output to emulate a resistor for suppressing filter resonance associated with the one or more power sources and to reduce or even cancel equivalent impedance of the power grid. Preferably, the voltage output is arranged to cancel the equivalent impedance of the power grid.

Preferably, the compensator circuit is that in the first aspect.

Preferably, the one or more electrical properties associated with the outputs comprises current $i_o$ through the outputs of the power sources; and the one or more electrical properties associated with the point of common coupling comprises voltage $\upsilon_{PCC}$ at the point of common coupling.

Preferably, the compensator circuit is connected in series with the outputs.

In a preferred embodiment of the second aspect, the compensator circuit comprises: a voltage source; a power converter having a switching network, arranged to regulate voltage of the voltage source to provide the voltage output; and a controller for controlling the switching network.

The power converter is preferably a bi-directional power converter and/or a DC/AC power converter.

Preferably, the method further comprises: detecting, using the controller, current $i_o$ through the outputs of the power sources and voltage $\upsilon_{PCC}$ at the point of common coupling.

Preferably, the method further comprises: determining, using the controller, a first voltage based on the detected current $i_o$; determining, using the controller, a second voltage based on the detected voltage $\upsilon$PCC; and filtering, using the controller, the first and second voltages using a band-stop filter.

Preferably, the method further comprises: detecting, using the controller, voltage $\upsilon_{dc}$ of the voltage source; and comparing, using the controller, the detected voltage $\upsilon_{dc}$ with a reference voltage $\upsilon_{dc,ref}$ to determine a difference signal.

Preferably, the method further comprises: generating, using the controller, gating signals for controlling the switching network based on the filtered first and second voltages and the determined difference signal, so as to regulate the voltage output.

The power grid is preferably an AC power grid but can also be a DC power grid.

In accordance with a third aspect of the invention, there is provided a method for regulating power transfer in a power grid, comprising: detecting, directly or indirectly, one or more electrical properties associated with outputs of one or more power sources and one or more electrical properties associated with a point of common coupling in the power grid; providing, by the compensator circuit, based on the detection, a voltage output to emulate a resistor for suppressing filter resonance associated with the one or more power sources and to reduce or even cancel equivalent impedance of the power grid.

It is an object of the invention to address the above needs, to overcome or substantially ameliorate the above disadvantages or, more generally, to provide an improved electric circuit for regulating power transfer in a power grid.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

Figure 1:
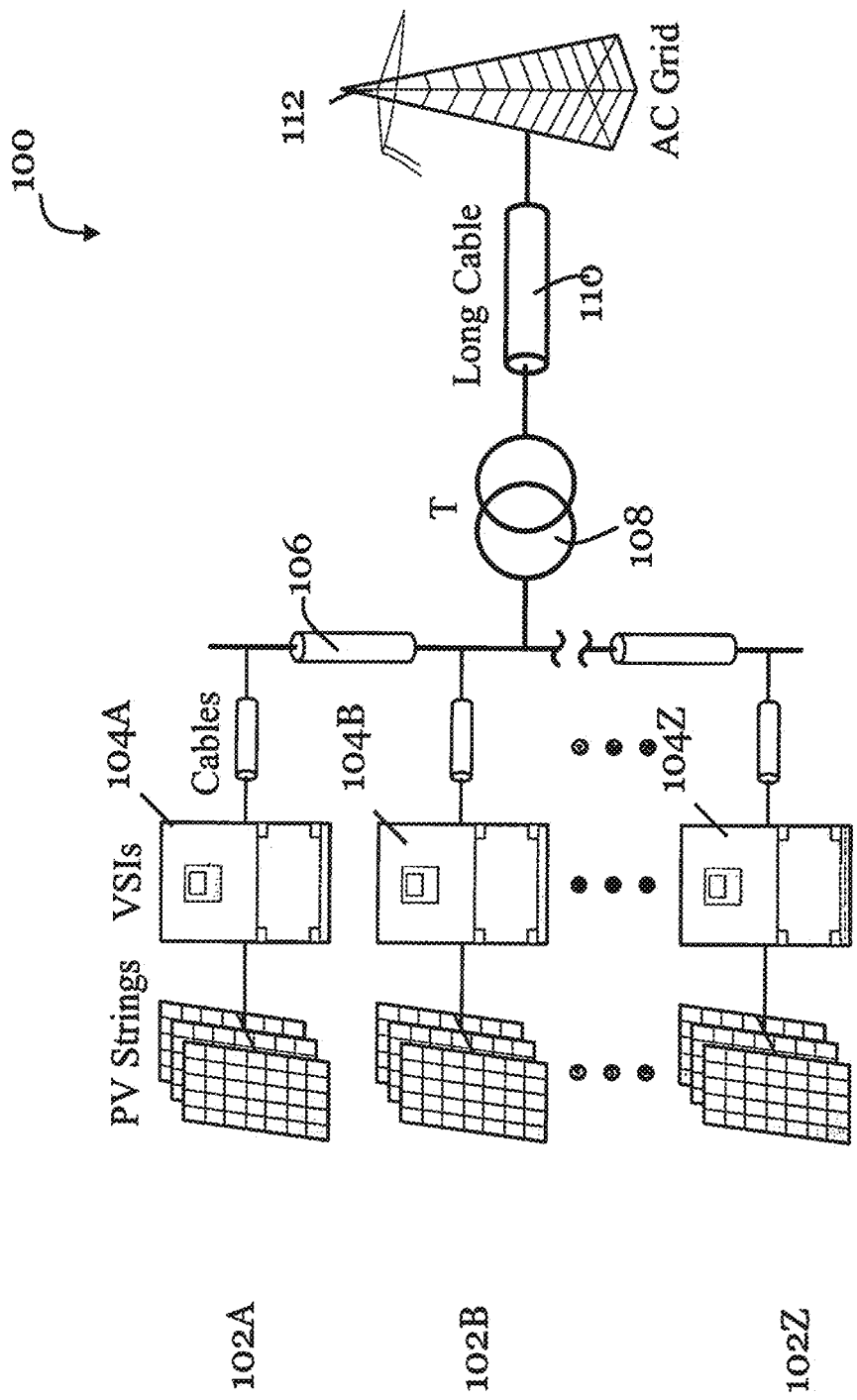
FIG. 1 is a schematic diagram showing an exemplary AC distributed power generation system (AC power grid)
Figure 2A:
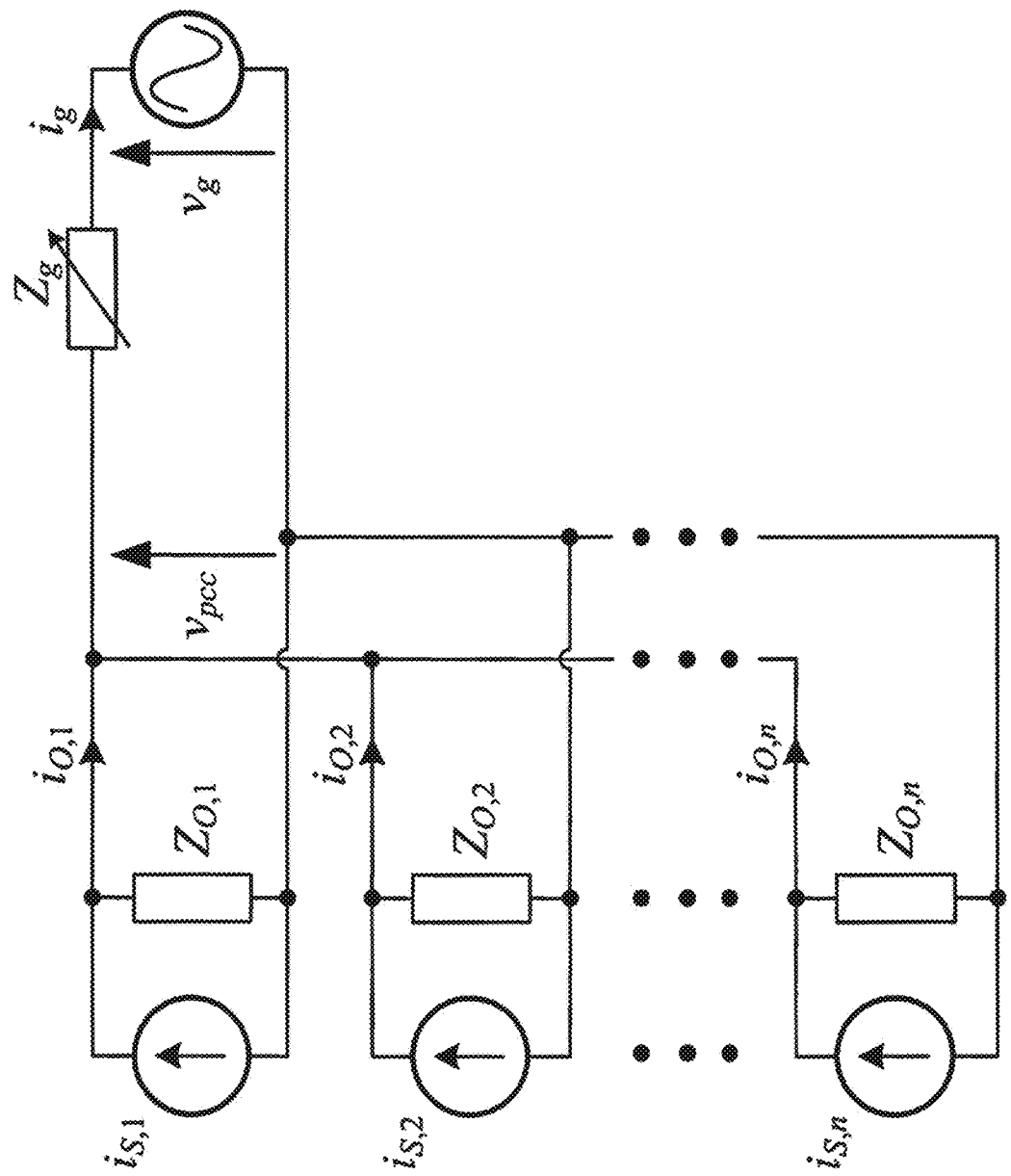
FIG. 2A is an equivalent impedance modeling circuit for the system in FIG. 1.
Figure 2B:
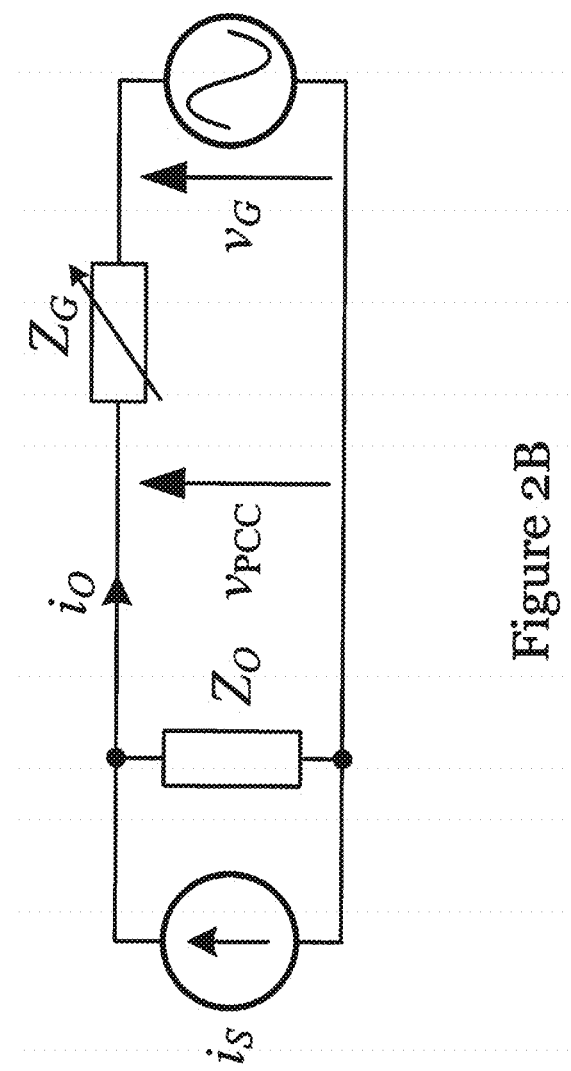
FIG. 2B is a simplified impedance modeling circuit for the circuit in FIG. 2A.
Figure 3:
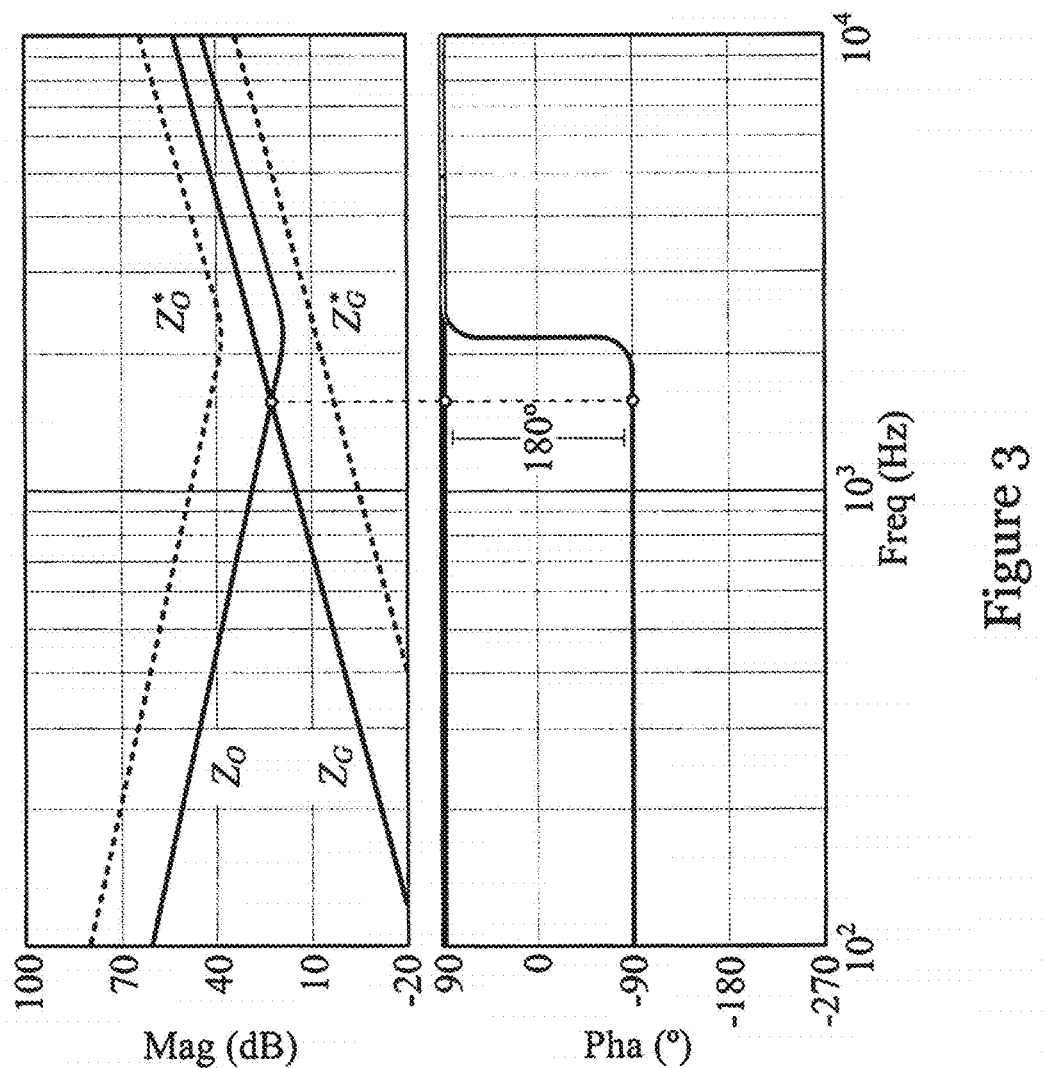
FIG. 3 are graphs showing magnitude and phase relationship between output impedance of the switching power converters in the power sources and the equivalent grid impedance in the power systems.

To mitigate the problems associated with system instability as illustrated in FIGS. 2B and 3, two arrangements have been proposed. The first arrangement relates to grid impedance reshaping using a parallel-connected device, and the second arrangement relates to SPC output impedance reshaping with a series-connected device.

Figure 4A:
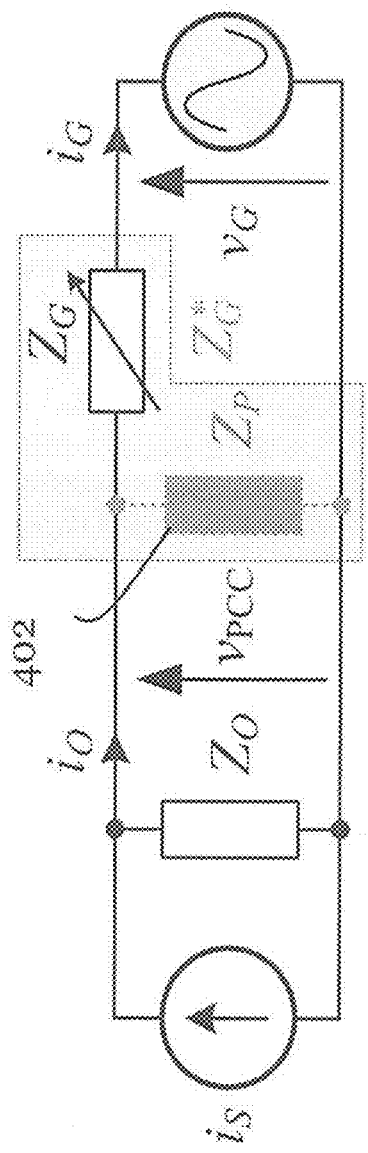
FIG. 4A is a circuit diagram illustrating a known arrangement for regulating grid impedance in the circuit of FIG. 2B.

In the first arrangement, to reduce the effect of the equivalent grid impedance $Z_G$, a device 402 based on passive or active electronic circuit components is connected in shunt at the point-of-common-coupling (PCC), as shown in FIG. 4A. The device 402 produces the impedance $Z_P$ such that the value of the reshaped grid impedance $Z_G^*$ becomes $$Z_G^* = Z_G \,//\, Z_P = \frac{Z_G + Z_P}{Z_G Z_P} \tag{1}$$

which is smaller than the original grid impedance value, i.e., $|Z_G^*|<|Z_G|$.

As shown in FIG. 3, the intersection with 180° phase difference between the original grid impedance $Z_G$ and the SPC output impedance $Z_O$ leads to the system instability, while the grid impedance decrease created by the parallel-connected device 402 can reduce the chance of and potentially avoid such unfavorable intersection.

Figure 4B:
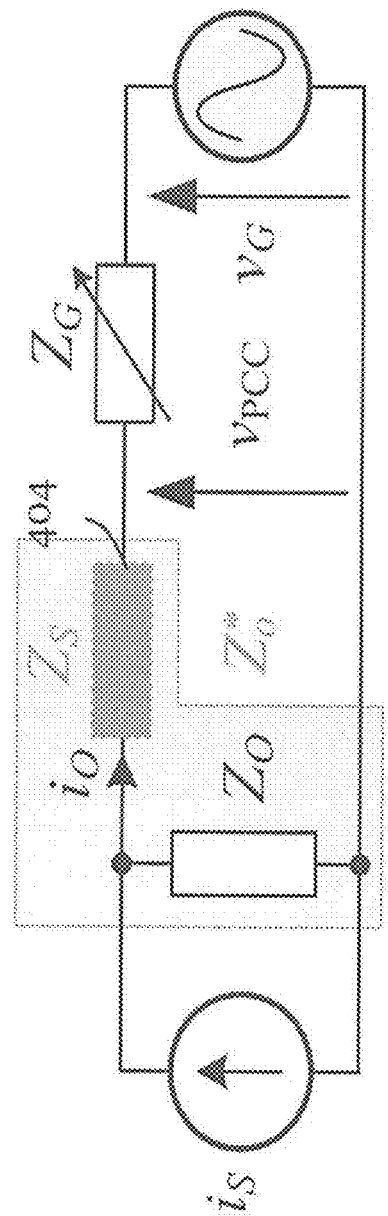
FIG. 4B is a circuit diagram illustrating a known arrangement for regulating impedance of the switching power converters in the circuit of FIG. 2B.

In the second arrangement, to reduce the effect of the equivalent SPC output impedance $Z_o$, a device 404 based on passive or active electronic circuit components is connected in series at the output of the SPC, as shown in FIG. 4B. The device 404 produces the impedance $Z_S$ such that the value of the reshaped grid impedance $Z_O{}^*$ becomes $$Z_O{}^* = Z_O + Z_S \qquad (2)$$

which is larger than the original SPC impedance value, i.e., $|Z_O{}^*| > |Z_O|$.

As shown in FIG. 3, in this second arrangement, the enhancement of the SPC output impedance $Z_O$ around the intersection frequency can reduce the chance of and can potentially avoid such unfavorable intersection.

The basic principle of performing the abovementioned impedance reshaping in the first and second arrangements is that the required reshaped impedance is related to the original grid impedance $Z_G$ as given in equations (1) and (2). In principle, use of zero parallel-connected impedance in the first arrangement, $Z_P = 0$, or infinite series-connected impedance in the second arrangement, $Z_S = \infty$, while can make the reshaped impedance load independent, will lead to severe current or voltage inrush. Also, the grid impedance $Z_G$ varies widely with the number of distributed power sources or the SPC, and cannot be known a priori. These pose challenges to the designers for determining appropriate values of parallel-connected impedance $Z_P$ or the series-connected impedance $Z_S$ that is needed to avoid the intersection or the unfavorable 180° intersection between the grid impedance and the SPC output impedance as shown in FIG. 3.

In the following embodiments of the invention, to dampen the filter resonance of the SPCs and to reduce or even cancel the effect of the grid impedance by providing load-independent impedance reshaping, the concept of virtual resistance and negative virtual impedance will be brought in. In the present invention, the virtual resistance is designed based on the filter parameters of the SPC, and the negative virtual impedance is connected in series at the SPC outputs and must have the same magnitude as the grid impedance $Z_G$. In other words, if the grid impedance consists of resistive, inductive, and capacitive properties, the series negative virtual impedance should also consist of negative resistive, negative inductive, and negative capacitive properties. More specifically, the series negative virtual impedance must have the same resistive, inductive, and capacitive magnitude (but different sign) as that of the grid impedance.

The following embodiments of the invention relates to using a compensation circuit, preferably an active circuit, to damp the filter resonance and cancel the grid impedance. In these embodiments, there is no need to know the values of the grid-side resistance, inductance, and capacitance a priori. The general idea of the invention is preferably based on using a voltage source with a power converter to connect in series with the outputs of the SPC. The power converter can generate necessary voltage waveforms to emulate a resistor and counteract the voltage drops of the grid impedance to ensure the filter resonance suppression and the cancellation of the grid impedance.

The following embodiments of the invention are based on the Thevenin's equivalent circuit and the Norton's equivalent circuit having a voltage source in series with the outputs of the SPC.

Referring to FIG. 2B, the grid current through the output of the SPC is $i_o$ and the voltage across the grid impedance $Z_G$ is $v_{Z_G}$. To emulate a resistor in series at the output of the SPC by using a series-connected voltage source, the voltage across it should be $$v_{C,R} = i_o R_d \qquad (3)$$

in which $R_d$ is the virtual resistance brought in by the series-connected compensator. Similarly, to cancel the grid impedance, the voltage across the series-connected voltage source should be $$v_{C,Z_G} = -v_{Z_G} \qquad (4)$$

meaning that the voltages across the grid impedance $V_{Z_G}$ and the series-connected voltage source $v_{C,GZ}$ have the same value and are out of phase.

To minimize the power consumption of the series-connected voltage sources, the dominant line-frequency components in equations (3) and (4) should be filtered. Thus, their voltages are governed by the formulas of $$v_{C,R}{}^* = BSF_{50}[v_{C,R}] = BSF_{50}[i_o R_d] \qquad (5)$$

$$v_{C,Z_G}{}^* = BSF_{50}[k \cdot v_{Z_G}] = -BSF_{50}[k \cdot (v_{Z_G} + v_G)] = -BSF_{50}[k \cdot v_{PCC}] \qquad (6)$$

in which $BSF_{50}$ refers to the band-stop filter attenuating the dominant line-frequency components, $v_G$ is the voltage of equivalent ideal grid source, $v_{PCC}$ is the voltage across the PCC, and k represents the weighted factor, $k<=1$.

Figure 5A:
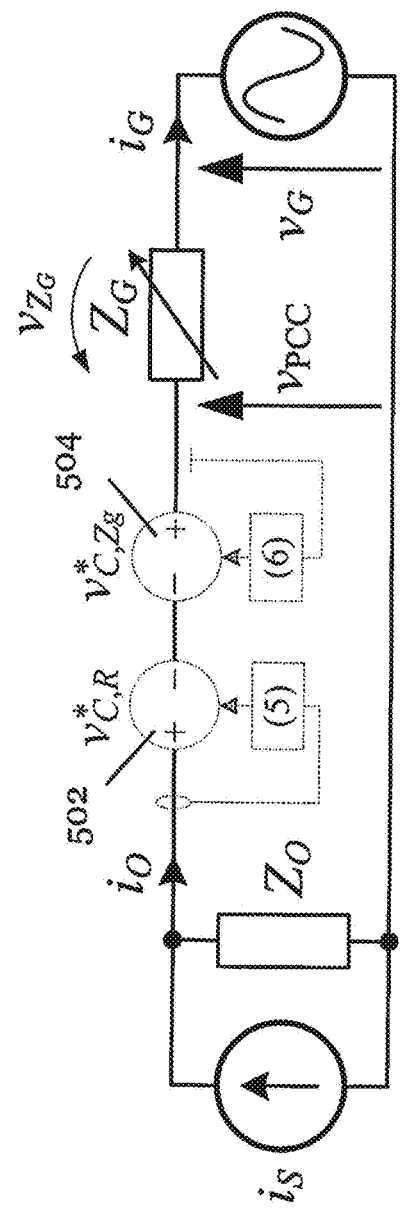
FIG. 5A is a circuit diagram illustrating two voltage sources for regulating grid impedance and impedance of the switching power converters in the circuit of FIG. 2B in accordance with one embodiment of the invention.

Thus, based on equations (5) and (6), the resistor emulation and the grid impedance cancellation can be assured if two series-connected voltage sources 502, 504, such as that shown in FIG. 5A, are used.

Figure 5B:
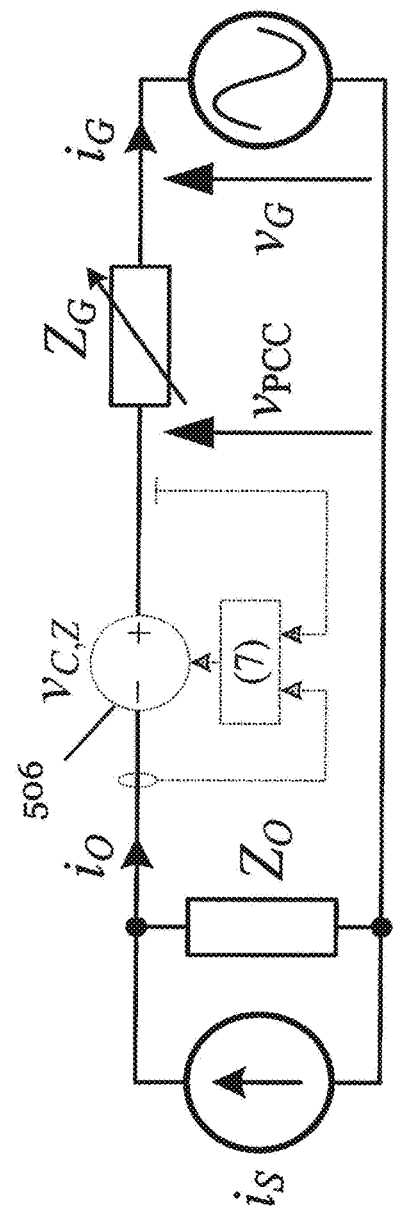
FIG. 5B is a circuit diagram illustrating a single voltage source for regulating grid impedance and impedance of the switching power converters in the circuit of FIG. 2B in accordance with one embodiment of the invention.

FIG. 5B shows that the two series-connected voltage sources 502, 504 combined as a single voltage source $v_{C,Z}$ 506 such that $$v_{C,Z} = v_{C,R}{}^* + v_{C,Z_G}{}^* \qquad (7)$$

Thus, by sensing the output current of the SPC and the voltage across the PCC, it is possible to derive the required voltages by the voltage source(s). In this embodiment, $i_o$ and $V_{PCC}$ have been sensed by the SPC, and $v_{C,Z_G}{}^*$ can be obtained by the phase-locked loop in the SPC controller.

Figure 6:
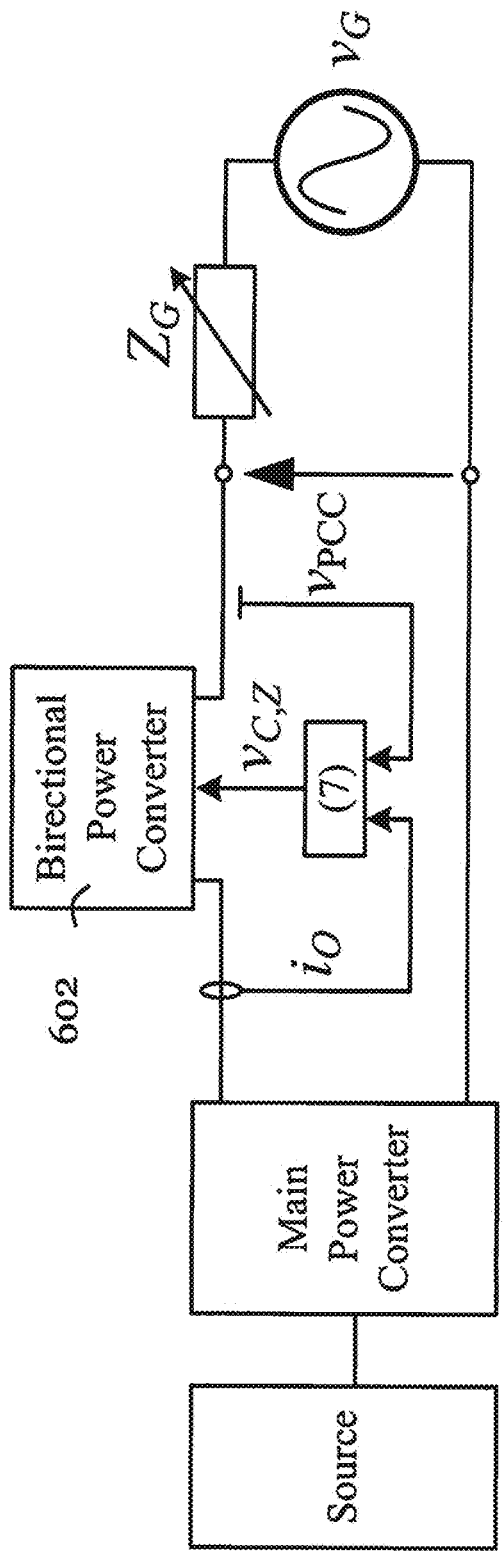
FIG. 6 is a circuit diagram illustrating a bi-directional power converter for regulating grid impedance and impedance of the switching power converters in the circuit of FIG. 2B in accordance with one embodiment of the invention.

The voltage source 506 in FIG. 5B can be further integrated and realized by a bidirectional power converter 602 connected in series at the PCC and generating the required voltage $\sigma_{C,Z}$, as defined in equation (7). FIG. 6 shows the compensator circuit, in the form of a bi-directional power converter 602, for regulating grid impedance and impedance of the switching power converters in the circuit of FIG. 2B in accordance with one embodiment of the invention.

As shown in FIG. 6, the bi-directional power converter 602 is connected between outputs of one or more power sources and a point of common coupling in the power grid. The directional power converter 602 is arranged to detect, directly or indirectly, one or more electrical properties associated with the outputs and one or more electrical properties associated with the point of common coupling; and provide, based on the detection, a voltage output to emulate a resistor for suppressing filter resonance associated with the one or more power sources and to reduce (or even cancel) equivalent impedance $Z_G$ of the power grid. The one or more electrical properties associated with the outputs may include current $i_o$ through the outputs of the power sources. Preferably, the one or more electrical properties associated with the point of common coupling may include voltage $v_{PCC}$ at the point of common coupling.

Figure 7:
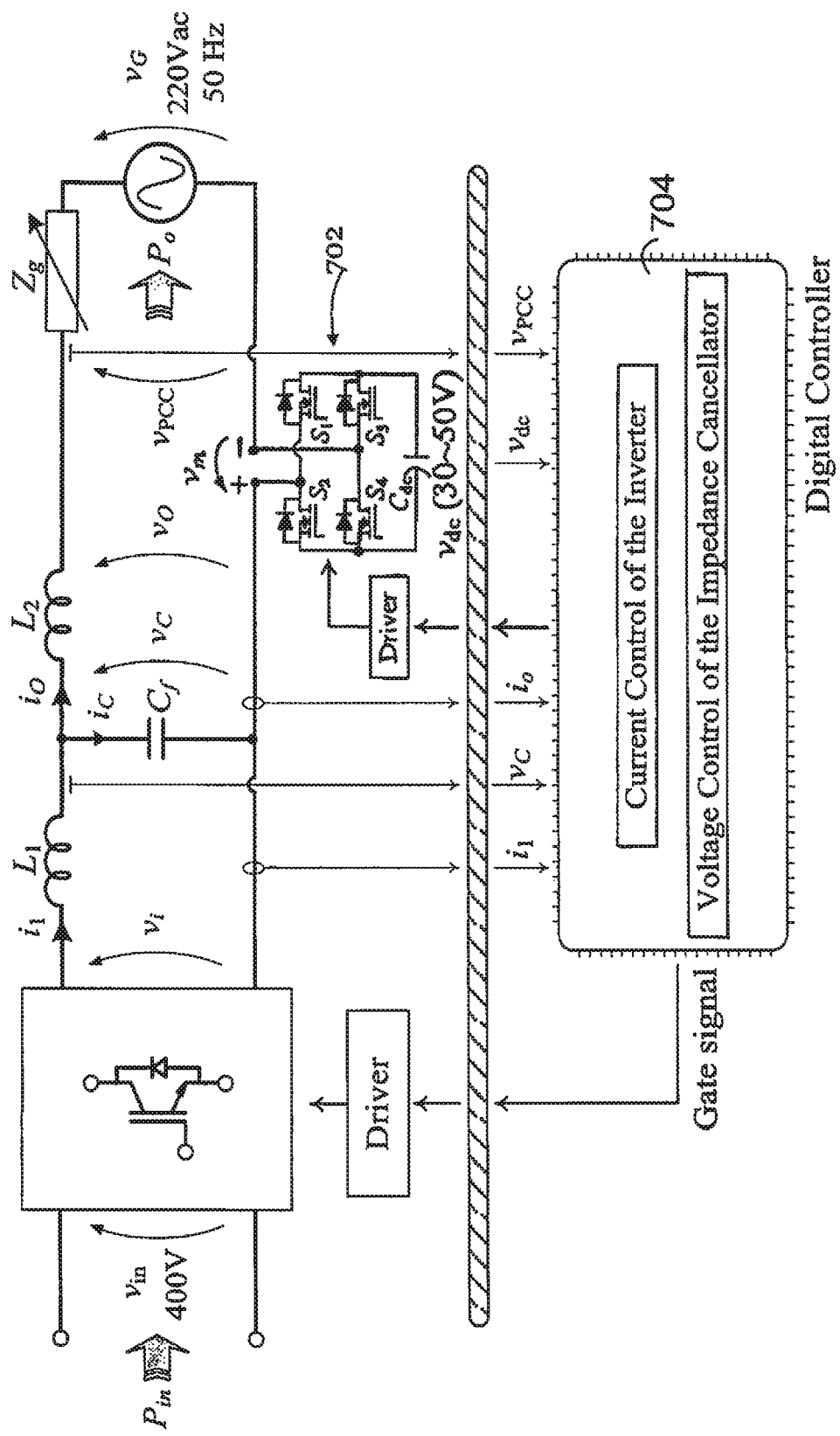
FIG. 7 is a circuit diagram illustrating a specific implementation of the bi-directional power converter of FIG. 6 in accordance with one embodiment of the invention.
Figure 8:
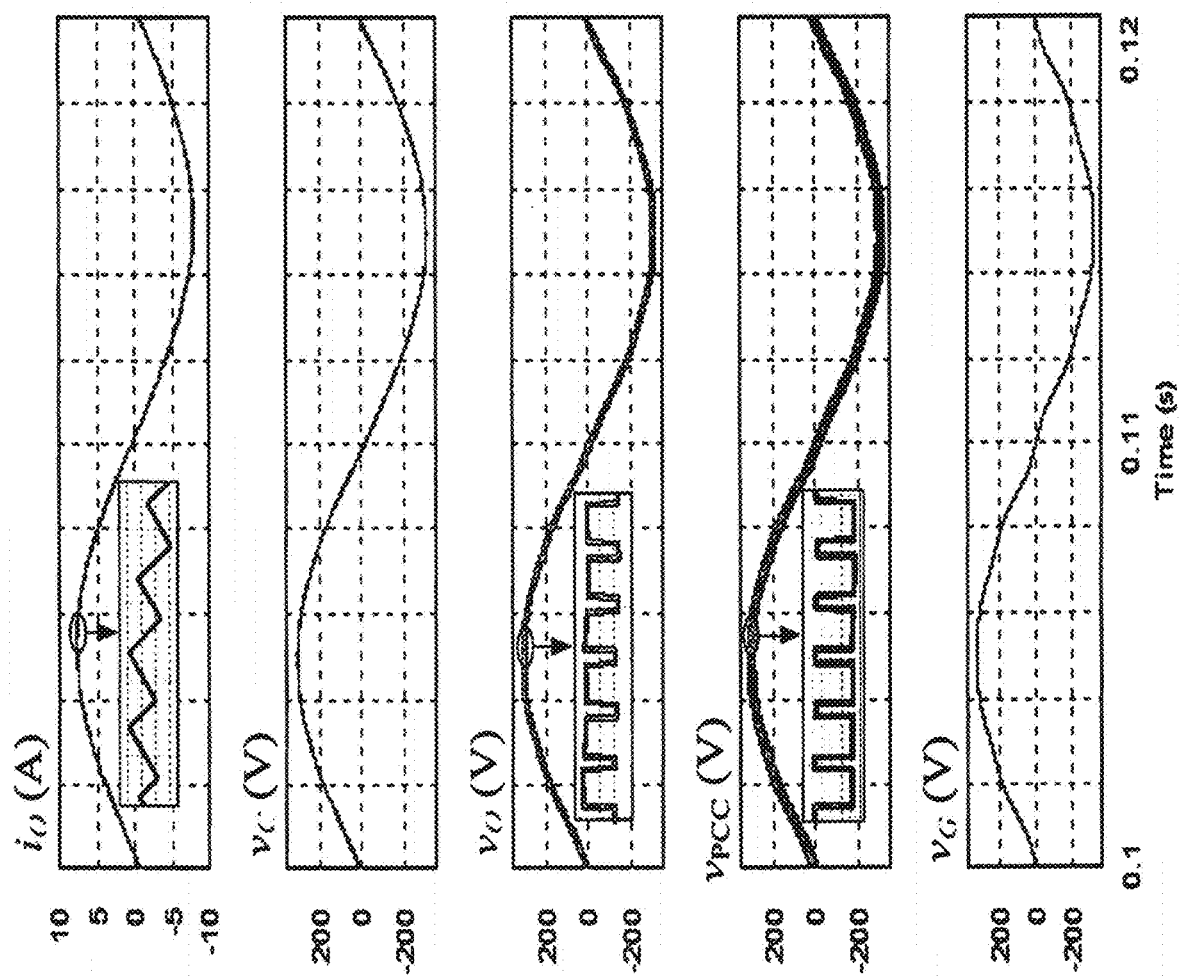
FIG. 8 are graphs showing the key waveforms in the circuit of FIG. 7.

FIG. 7 is a circuit diagram illustrating a specific implementation of the bi-directional power converter 602 of FIG. 6 in accordance with one embodiment of the invention; FIG. 8 shows the corresponding key waveforms in the circuit of FIG. 7. As shown in FIG. 7, the compensator circuit includes a voltage source $C_{dc}$; a power converter 702 having a switching network $S_1$-$S_4$, arranged to regulate voltage of the voltage source to provide the voltage output $v_m$; and a controller 704 for controlling the switching network $S_1$-$S_4$.

In the present embodiment the bidirectional power converter 702 is a DC/AC converter. The bidirectional power converter 702 is connected, at the AC side, with PCC and connected, at the DC side, across a power capacitor bank. The voltage of the capacitor bank at the DC side is sustained at a much smaller value than the grid voltage through a closed-loop feedback regulation. Also, the controller 704 is arranged to detect current $i_o$ through the outputs of the power sources and voltage $v_{PCC}$ at the point of common coupling. The controller 704 is also arranged to determine a first voltage $v_{C,R}*$ based on the detected current $i_o$; determine a second voltage $v_{C,Z_G}*$ based on the detected voltage $v_{PCC}$; and filter the first and second voltages using a band-stop filter such as a notch filter. The controller 704 is also arranged to detect voltage $v_{dc}$ of the voltage source; and compare the detected voltage $v_{dc}$ with a reference voltage $v_{dc,ref}$ to determine a difference/error signal. The controller 704, with driver and PWM units, generates gating signals for controlling the switching network based on the filtered first and second voltages and the determined difference signal, so as to regulate the voltage output.

In operation, the sensed DC voltage is compared with a reference DC voltage for generating an error value, which is then forwarded to a proportional-integral (PI) compensator to minimize such error value. Then, the output signal of the PI compensator is multiplied with the sinusoidal signal in phase with the PCC voltage, and forms the combined signal as follows, $$v_{C,AC} = \sin\theta \cdot v_{PI} \quad (8)$$

where the sinusoidal signal is derived from the phase-locked-loop (PLL) in the inverter controller. The gate signals for the switches in the switching network are generated by a pulse-width modulator (PWM). The formulas defined in equations (7) and (8) are summed up as a modulating signal for the modulator $$v_m = v_{C,Z} + v_{C,AC} \quad (9).$$

The bidirectional DC/AC converter 702 absorbs high-frequency components, as described in equation (7), to emulate the resistive component $R_d$ and counteract the effects of the grid impedance on the current-controlled inverter. The absorbed high-frequency power is transferred to low-frequency one by forming a voltage in phase with the line voltage, as described in equation (8), so as to sustain the voltage $v_{dc}$ across the capacitor $C_{dc}$ at the reference value $v_{dc,ref}$. The absorbed real power is to compensate the power dissipation of the entire system and emulate the resistive component $R_d$.

Figure 9:
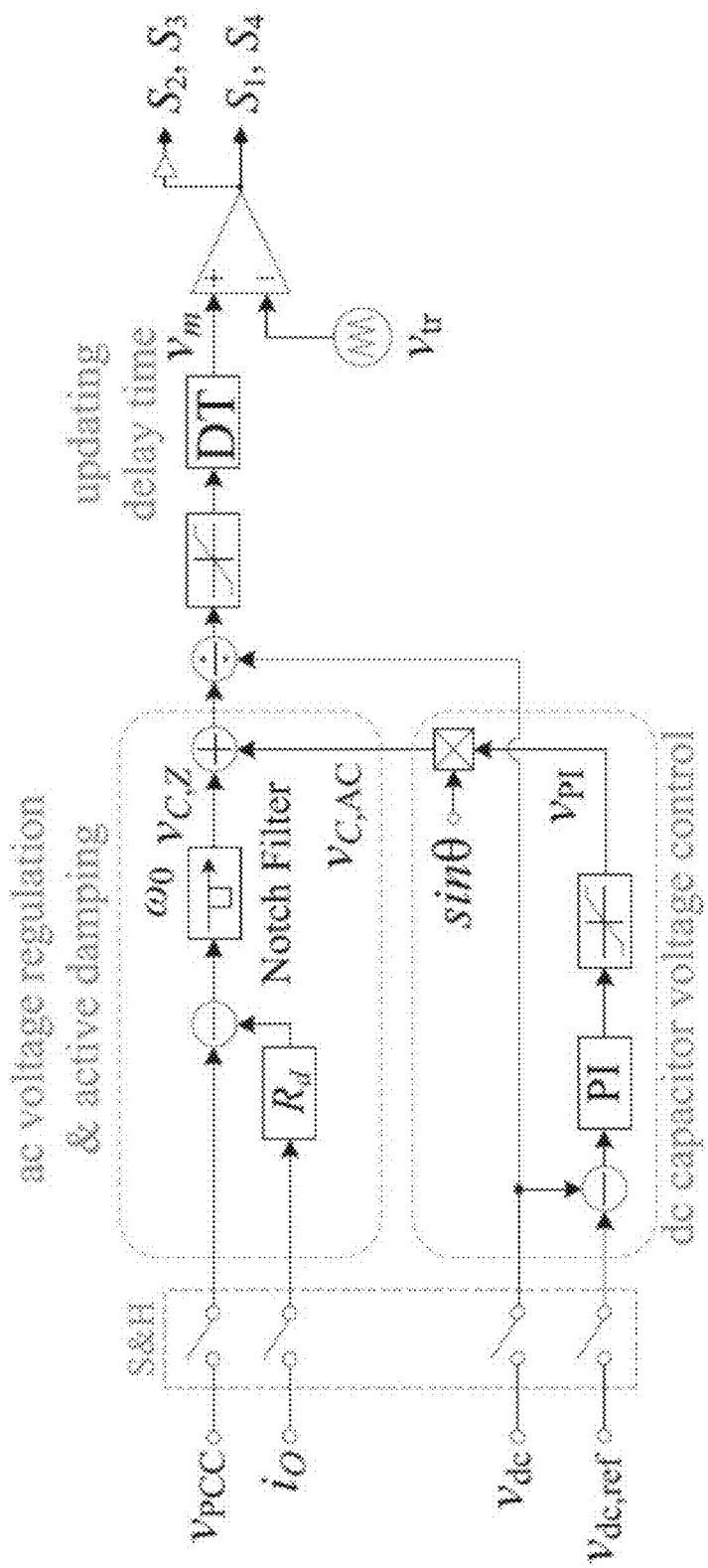
FIG. 9 is control block diagram for the bi-directional power converter in the circuit of FIG. 7.

A detailed control block diagram of the bidirectional power converter 702 is shown in FIG. 9. In FIG. 9, $\omega_o$ is the angular line frequency and $v_r$ represents the carrier waveform for the modulator.

The above embodiments of the present invention is advantageous in that, through the use of the proposed compensator circuit, it is unnecessary to know the intrinsic parameters about the inverter output power filter and the grid impedance to counteract the effect of the grid impedance, and no additional power filter at the ac side of the compensated converter is needed (due to the existence of that of the renewable power inverter). The above embodiments of the present invention can effectively counteract the effect of the grid impedance on the DPG system stability and can be readily applied to electric circuits adapted for delivering power to the power grid using for example a DC/AC grid-connected inverter.

It will be appreciated that where the methods and systems of the invention can alternatively (instead of using only active and/or passive electronic components) be either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example, the circuit arrangement may be used in a DC power grid instead. The circuit arrangement may also be used in other power electronic circuits with multiple power sources and loads. The compensator circuit need not be formed by a bi-directional power converter, but can be formed by other active circuit components. The power converter can alternatively be unidirectional. The specific implantation of the power converter may vary, e.g., the switching network may comprise other number of switches. The present embodiments are, therefore, to be considered in all respects as illustrative and not restrictive.

The invention claimed is:

1. An electric circuit for regulating power transfer in a power grid, comprising:
   a compensator circuit arranged to be connected between outputs of one or more power sources and a point of common coupling in the power grid;
   wherein the compensator circuit comprises:
     a voltage source;
     a power converter having a switching network, arranged to regulate voltage of the voltage source to provide a voltage output to emulate a resistor for suppressing filter resonance associated with the one or more power sources and to reduce equivalent impedance of the power grid; and
     a controller for controlling the switching network, the controller is arranged to:
       detect current $i_o$ through the outputs of the power sources and voltage $v_{PCC}$ at the point of common coupling;
       determine a first voltage based on the detected current $i_o$;
       determine a second voltage based on the detected voltage $v_{PCC}$;
       filter the first and second voltages using a band-stop filter;
       detect voltage $v_{dc}$ of the voltage source;
       compare the detected voltage $v_{dc}$ with a reference voltage $v_{dc,ref}$ to determine a difference signal; and
     generate gating signals for controlling the switching network based on the filtered first and second voltages and the determined difference signal, so as to regulate the voltage output.

2. The electric circuit of claim 1, wherein the compensator circuit is an active circuit.

3. The electric circuit of claim 1, wherein the voltage output is arranged to cancel the equivalent impedance of the power grid.

4. The electric circuit of claim 1, wherein the compensator circuit is connected in series with the outputs.

5. The electric circuit of claim 1, wherein the voltage source comprises:
 a first voltage source arranged to provide a first voltage output to emulate a resistor for suppressing filter resonance associated with the one or more power sources; and
 a second voltage source arranged to provide a second voltage output to reduce equivalent impedance of the power grid;
 wherein the first and second voltage outputs form the voltage output.

6. The electric circuit of claim 1, wherein the voltage source comprises:
 a single voltage source arranged to emulate a resistor for suppressing filter resonance associated with the one or more power sources and to reduce equivalent impedance of the power grid.

7. The electric circuit of claim 1, wherein the voltage source comprises a capacitor.

8. The electric circuit of claim 1, wherein the power converter is a bi-directional power converter.

9. The electric circuit of claim 1, wherein the power converter is a DC/AC power converter.

10. The electric circuit of claim 1, wherein the one or more power sources each comprises a switching power converter.

11. The electric circuit of claim 1, wherein the power grid is an AC power grid.

12. The electric circuit of claim 1, wherein the power grid is a DC power grid.

13. A method for regulating power transfer in a power grid using an electric circuit, the electric circuit including a compensator circuit arranged to be connected between outputs of one or more power sources and a point of common coupling in the power grid, the compensator circuit comprising a voltage source; a power converter having a switching network, arranged to regulate voltage of the voltage source to provide a voltage output; and a controller for controlling the switching network, the method comprising:
 detecting, using the controller, current $i_o$ through the outputs of the power sources and voltage $v_{PCC}$ at the point of common coupling;
 determining, using the controller, a first voltage based on the detected current $i_o$;
 determining, using the controller, a second voltage based on the detected voltage $v_{PCC}$;
 filtering, using the controller, the first and second voltages using a band-stop filter;
 detecting, using the controller, voltage $v_{dc}$ of the voltage source;
 comparing, using the controller, the detected voltage $v_{dc}$ with a reference voltage $v_{dc,ref}$ to determine a difference signal;
 generating, using the controller, gating signals for controlling the switching network based on the filtered first and second voltages and the determined difference signal, so as to regulate the voltage output; and
 providing, by the voltage source, based on the detection, the voltage output to emulate a resistor for suppressing filter resonance associated with the one or more power sources and to reduce or cancel equivalent impedance of the power grid.

14. The method of claim 13, wherein the one or more electrical properties associated with the outputs comprises current $i_o$ through the outputs of the power sources; and the one or more electrical properties associated with the point of common coupling comprises voltage $v_{PCC}$ at the point of common coupling.

15. The method of claim 13, wherein the compensator circuit is connected in series with the outputs.

16. The method of claim 13, wherein the power converter is a bi-directional power converter.

17. The method of claim 13, wherein the power converter is a DC/AC power converter.

18. The method of claim 13, wherein the power grid is an AC power grid.

* * * * *